United States Patent [19]

Niiyama

[11] Patent Number: 5,641,043

[45] Date of Patent: Jun. 24, 1997

[54] CONTROL APPARATUS FOR HYDRAULICALLY OPERATED VEHICULAR TRANSMISSION

[75] Inventor: Tsunefumi Niiyama, Saitama-ken, Japan

[73] Assignee: Honda Giken Kogyo Kabushiki Kaisha, Tokyo, Japan

[21] Appl. No.: 592,807

[22] Filed: Jan. 26, 1996

[30] Foreign Application Priority Data

Jan. 31, 1995 [JP] Japan .................... 7-014059

[51] Int. Cl.⁶ .................... F16H 61/14; F16H 59/08
[52] U.S. Cl. .................... 192/3.63; 475/65; 192/3.58
[58] Field of Search .................... 475/65, 127; 192/3.58, 192/3.63

[56] References Cited

U.S. PATENT DOCUMENTS

| | | | |
|---|---|---|---|
| 4,936,166 | 6/1990 | Holbrook et al. | 74/733 |
| 4,989,702 | 2/1991 | Yoshimura et al. | 475/65 |
| 4,996,894 | 3/1991 | Holbrook et al. | 192/3.58 |
| 4,998,604 | 3/1991 | Vukovich et al. | 475/65 |
| 5,010,990 | 4/1991 | Yoshimura et al. | 475/65 |

FOREIGN PATENT DOCUMENTS 2278076  11/1990  Japan .

*Primary Examiner*—Dirk Wright
*Attorney, Agent, or Firm*—Lyon & Lyon LLP

[57] ABSTRACT

A control apparatus for a hydraulically operated transmission for a vehicle has a control circuit portion for a lockup clutch and a solenoid valve for controlling a clutch which is engaged in a particular drive range. In another drive range in which the clutch is not engaged, an output pressure of the solenoid valve is inputted to the control circuit portion. A changeover valve can be switched between a first position in which a first oil passage to be connected to an output side of the solenoid valve in the drive range and a second oil passage to be communicated with the control circuit portion are brought into communication with each other, and a second position in which this communication is shut off. The changeover valve is switched to the first position by a hydraulic oil pressure which is generated at the time of establishing a predetermined transmission train other than the first-speed transmission train. An input oil passage inputs the first signal pressure to urge the changeover valve to the first position in interlocking with switching of the changeover valve to the first position. The first signal pressure is maintained to a constant pressure without influence by speed changing.

9 Claims, 3 Drawing Sheets

CONTROL APPARATUS FOR HYDRAULICALLY OPERATED VEHICULAR TRANSMISSION

BACKGROUND OF THE INVENTION

1. Field of the Invention

The present invention relates to a control apparatus for a hydraulically operated transmission which is connected to an engine via a fluid torque converter with a lockup clutch and which is mainly used in an automatic transmission for a vehicle such as a motor vehicle.

2. Description of the Related Art

An automatic transmission can normally be operated for selective switching among parking range, reverse range, neutral range, automatic transmission (Drive or D) range, and low-speed holding range. In the automatic transmission range, overrotation of the output side is allowed via a one-way clutch at the time of establishment of a low-speed transmission train. In the low-speed holding range, a hydraulic engaging element for engine braking which operates to lock the one-way clutch is engaged to thereby establish a low-speed transmission train in a condition in which the overrotation of the output side is not allowed, i.e., in a condition in which the engine braking can be applied or effected.

Conventionally, there is known an apparatus in which a plurality of hydraulic engaging elements provided in a transmission are controlled by a plurality of solenoid valves corresponding to these hydraulic engaging elements. In such an apparatus, since the hydraulic engaging element for engine braking is not engaged in the automatic transmission range, it has been considered advantageous to utilize the solenoid valve which controls the hydraulic engaging element for engine braking, to also control that lockup clutch of the fluid torque converter which becomes necessary in the automatic transmission range.

For example, in Japanese Published Unexamined Patent Application No. 278076/1990, an apparatus is known in which there is provided a shift valve for engine braking for switching on and off a hydraulic engaging element for engine braking, and a lockup shift valve for switching on and off a lockup clutch. In the low-speed holding range, the lockup shift valve is restrained to a switched off position (OFF position) and also the shift valve for engine braking is switched by the output pressure of a solenoid valve to thereby control the switching on and off of the hydraulic engaging element for engine braking. On the other hand, in the automatic transmission range, the shift valve for engine braking is restrained to the OFF position, and the lockup shift valve is switched by the output pressure of the same solenoid valve as above to thereby control the switching on and off of the lockup clutch.

In the above-described apparatus, when the output pressure of the solenoid valve remains a high pressure due to failure or trouble of the solenoid valve, the lockup clutch will always be switched on in the automatic transmission range. As a result, engine stalling is likely to occur at the time of starting a vehicle.

Though not provided with a one-way clutch, there is known a transmission of the following construction. Namely, there is provided a changeover valve for selectively connecting an oil passage on the output side of a solenoid valve which controls a hydraulic engaging element for a low-speed transmission train to an oil passage for controlling the hydraulic engaging element and to an oil passage for controlling the lockup clutch. The changeover valve is switched by the hydraulic oil pressure to be generated at the time of establishing a high-speed transmission train to thereby connect the oil passage for controlling the lockup clutch to the oil passage on the output side of the solenoid valve. The operation of the lockup clutch is thus controlled by the output pressure of the solenoid valve (see the specification of U.S. Pat. No. 4,936,166).

By applying this kind of art, the following control may be considered. Namely, there is provided a changeover valve between an oil passage to be connected, in the automatic transmission range, to the output side of a solenoid valve for controlling the hydraulic engaging element for engine braking and an oil passage to be communicated with a control circuit portion of a lockup clutch. The changeover valve is switched by the hydraulic oil pressure to be generated at the time of establishing a transmission train other than the lowest-speed transmission train that can be established in the automatic transmission train, i.e., the first-speed transmission train. Both the above-described oil passages are thus communicated with each other to thereby control the operation of the lockup clutch by the output pressure of the solenoid valve.

According to this arrangement, even if the output pressure of the solenoid valve may remain a high pressure, the changeover valve is in a condition of shutting off the communication between both the oil passages at the time of starting of the vehicle by establishing the first-speed transmission train. Therefore, the lockup clutch will not be switched on and consequently the engine stalling will not occur. In this arrangement, however, that hydraulic oil pressure to be operated on the changeover valve which is generated at the time of establishing a transmission train other than the first-speed transmission train varies at the time of speed changing. Therefore, there is a possibility that the changeover valve may temporarily be switched to the condition in which the communication of both the oil passages is shut off at the time of speed changing while the vehicle is running at a speed above the second-speed transmission train, resulting in an unstable control of the lockup clutch.

In view of the above-described points, the present invention has an object of providing a control apparatus for a hydraulically operated transmission in which the engine stalling at the time of starting the vehicle is prevented and in which the lockup clutch can be stably controlled.

SUMMARY OF THE INVENTION

In order to attain the above and other objects, the present invention is a control apparatus for a hydraulically operated transmission for a vehicle, the transmission being connected to an engine of the vehicle via a fluid torque converter with a lockup clutch, the control apparatus comprising: a control circuit portion for the lockup clutch; a solenoid valve for controlling a hydraulic engaging element for speed changing which is engaged in a particular drive range, the control apparatus being arranged such that, in another drive range in which the hydraulic engaging element is not engaged, an output pressure of the solenoid valve is inputted to the control circuit portion to thereby control the operation of the lockup clutch; and a changeover valve which can be switched between a first position in which a first oil passage connected to an output side of the solenoid valve in said another drive range and a second oil passage to be communicated with the control circuit portion are brought into communication with each other, and a second position in which the communication is shut off; the changeover valve being arranged to be switched to the first position by a hydraulic oil pressure which is generated at the time of establishing a predetermined transmission train other than a lowest transmission train that can be established in said another drive ranges; the changeover valve comprising hydraulic oil pressure input means for inputting a predetermined first signal pressure as a hydraulic oil pressure to urge the changeover valve to the first position in interlocking with switching of the changeover valve to the first position, the first signal pressure being maintained to a constant pressure without influence by speed changing and being free from generation at a neutral range.

When the vehicle is started by switching to said another drive range, the transmission train of the lowest speed is established first. In this condition, since the changeover valve is maintained in the second position in which the communication between the first oil passage and the second oil passage is shut off, the lockup clutch will not be switched on even if the output pressure of the solenoid valve is kept high due to its failure or trouble. The vehicle can thus be started smoothly without the occurrence of an engine stalling due to a torque amplification operation of the fluid torque converter.

Once the predetermined transmission train has been established by an upshifting operation after starting the vehicle, the changeover valve is switched to the first position by the hydraulic oil pressure to be generated at this time. The first oil passage and the second oil passage are thereby communicated, so that it becomes possible to control the operation of the lockup clutch by the output pressure of the solenoid valve. Further, once the changeover valve has been switched to the first position, it is maintained to the first position by the first signal pressure to be inputted via the hydraulic oil pressure input means until it is returned to the neutral range. Therefore, the changeover valve is not temporarily switched to the second position during the speed changing, with the result that the lockup clutch can be stably controlled.

As the first signal pressure, there can be used an oil pressure in a oil passage which is connected to a hydraulic oil pressure source in said another drive range and which is opened to the atmosphere in the neutral range.

In order to improve the specific fuel consumption, it is desired to switch the changeover valve to the first position when upshifting has been made to a transmission train of relatively low speed among the transmission trains other than that of the lowest speed and then to switch on the lockup clutch at an early stage after starting of the vehicle. Further, during running at a high speed in the high-speed transmission train, if switching is made by wrong operation or the like once to the neutral range and is then returned to said another drive range, the high-speed transmission train is established from the beginning. Therefore, if the predetermined transmission train is selected to be only the transmission train of a low speed, the changeover valve will be maintained to the second position until the speed is downshifted to that transmission train, with the result that the lockup clutch cannot be switched on and, therefore, that the specific fuel consumption becomes poor. As a solution, it is desirable to make up the predetermined transmission train by at least two transmission trains of a relatively low speed and a relatively high speed so that, when switching is made once to the neutral range and then returned to said another drive range during running at a high speed, the changeover valve can be switched to the first position without downshifting to the low-speed transmission train.

Further, once the changeover valve is switched to the first position, the changeover valve is maintained in the first position during the running in said another drive range. Therefore, if the output pressure remains in the high pressure due to failure or trouble in the solenoid valve, the lockup clutch cannot be switched off when stopping the vehicle, resulting in an engine stalling at the time of stopping. Thereafter, if switching is made to the neutral range, the changeover valve can be switched to the second position, and the vehicle can be started again by changing the changeover valve to said another drive range. It is, however, necessary to control the speed changing not to establish the predetermined transmission train after starting again. In case the predetermined transmission train is made up by at least two transmission trains of a relatively low speed and a relatively high speed as described above, if both the transmission trains are selected to be those which are not in succession in the order of speed and if the intermediate transmission train is not selected to be the predetermined transmission train, a required minimum running capacity can advantageously be secured by the intermediate transmission train.

By the way, in order to control the hydraulic engaging element in the above-described particular drive range by the solenoid valve, it may be so arranged that the control oil passage for the hydraulic engaging element is always connected to the output side of the solenoid valve in the particular drive range. However, in case the hydraulic engaging element is an engine braking hydraulic engaging element and the particular drive range is the low-speed holding range, if the output pressure of the solenoid valve remains to be a high pressure due to a failure or trouble of the solenoid valve, there will occur large shocks due to immediate engagement of the hydraulic engaging element when switched by mistake to the low-speed holding range while running at a high speed.

On the contrary, if an arrangement is made such that the control apparatus further comprises a third oil passage which is connected to an output side of the solenoid valve in the particular drive range, that the third oil passage is connected to a control oil passage for controlling the hydraulic engaging element via the changeover valve in the second position of the changeover valve, and that the changeover valve can be switched to the second position by a variably controllable second signal pressure against an urging force of the first signal pressure, the changeover valve will not be switched to the second position unless the second signal pressure becomes high even if switching is made by mistake during a high speed running to the particular drive range. The output pressure of the solenoid valve is thus not supplied to the control oil passage for the hydraulic engaging element. Even if the output pressure of the solenoid valve remains high, the hydraulic engaging element will not immediately be engaged by switching to the particular drive range. The shocks can be prevented by making a control such that, when the vehicle speed has lowered, the second signal pressure is increased to switch the changeover valve to the second position.

In this case, the changeover valve must be provided with a valve portion for controlling the communication between the third oil passage and the control oil passage for the hydraulic engaging element aside from the valve portion for controlling the communication between the first oil passage and the second oil passage. This may results in a large changeover valve and a poor response in the switching operation of the changeover valve due to an increase in the weight. As a solution, it is preferable to divide the changeover valve into a first changeover valve for controlling the communication between the first oil passage and the second oil passage, and a second changeover valve for controlling the communication between the third oil passage and the control oil passage for the hydraulic engaging element, to thereby improve the response.

By the way, as the hydraulic oil input means, there can be considered various ones. It is however advantageous because of a simpler construction if the hydraulic oil pressure input means comprises an input oil passage for inputting the first signal pressure to the changeover valve and a valve portion which is interposed in the input oil passage and which is formed integrally with the changeover valve for opening the input oil passage in the first position of the changeover valve. Further, it is advantageous in minimizing the changeover valve if the input oil passage is connected via a shuttle valve to an oil passage for inputting to the changeover valve a hydraulic oil pressure to be generated at the time of establishing the predetermined transmission train, because it becomes needless to provide an oil chamber exclusively for the second signal pressure.

Further, in case there is provided a second solenoid valve which is other than the above-described solenoid valve and which contributes to speed change control in said another drive range but which does not contribute to speed change control in the particular drive range, there can be provided a fourth oil passage which is connected to the output side of the second solenoid valve in the particular drive range, and an oil pressure in the fourth oil passage can be inputted to the changeover valve as the second signal pressure. It is thus advantageous because the solenoid valve for exclusive use for the second signal pressure need not be provided.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
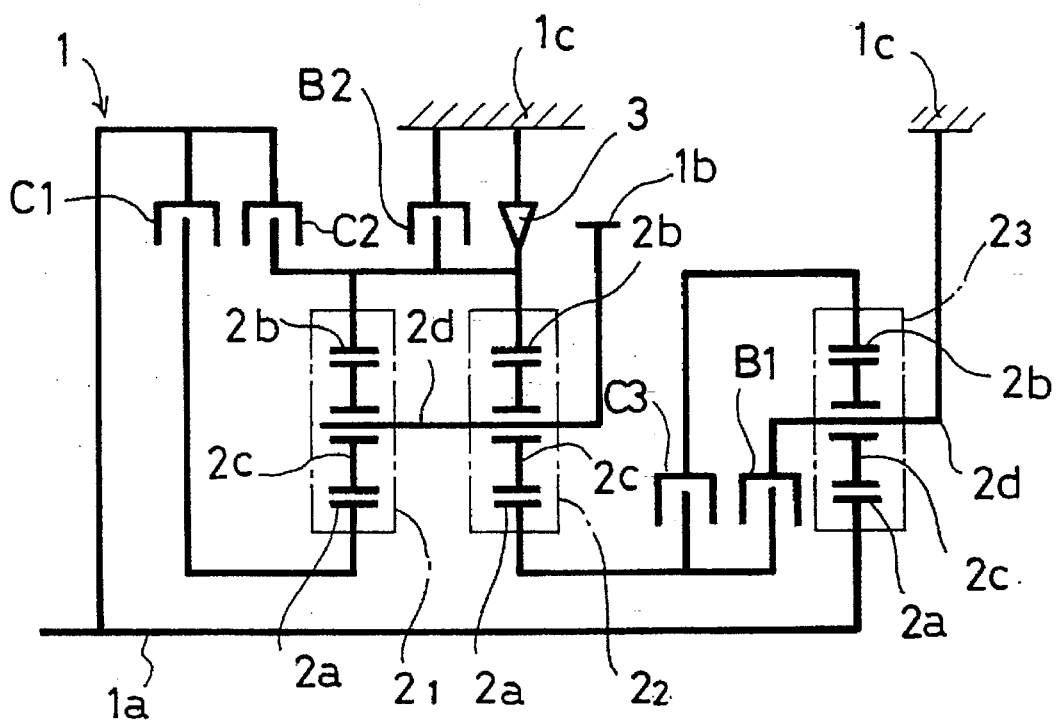
FIG. 1 is a skeleton diagram of an example of a transmission to which the present invention is applied.
Figure 2:
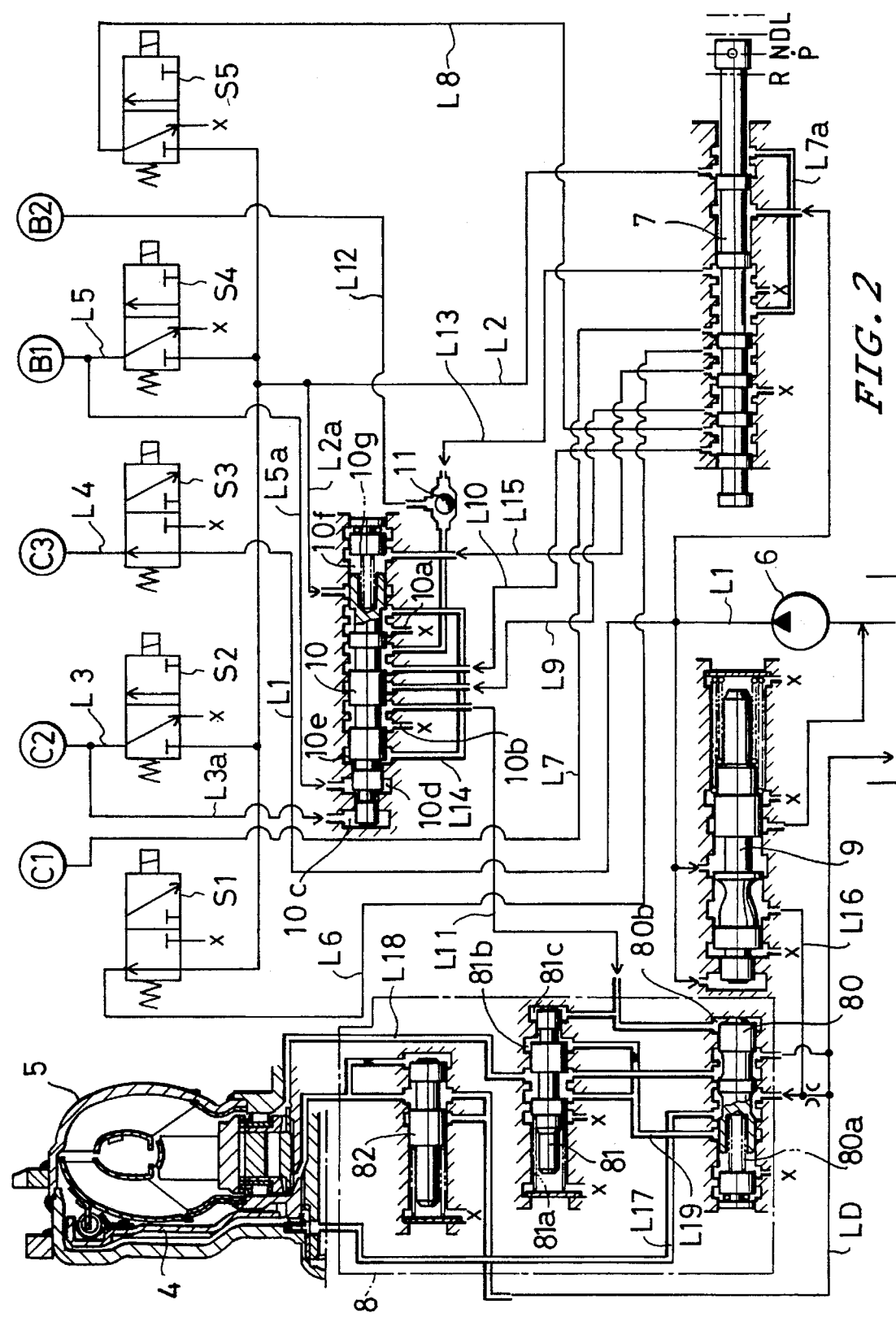
FIG. 2 is a hydraulic circuit diagram of one example of the apparatus of the present invention.

With reference to FIG. 1, numeral 1 denotes a transmission. This transmission 1 is constituted by a planetary gear type of transmission provided with an input shaft 1a and a first through a third coaxially disposed three planetary gears $2_1$, $2_2$ and $2_3$ for effecting five-speed forward transmission trains and one reverse transmission train. It is connected to an engine (not shown) via a fluid torque converter 5 with a lockup clutch 4 as shown in FIG. 2.

Each of the planetary gears $2_1$, $2_2$ and $2_3$ comprises a sun gear 2a, a ring gear 2b, a pinion 2c which engages with both the gears 2a and 2b, and a carrier 2d which rotatably supports the pinion 2c. The ring gears 2b and the carriers 2d of both the first and the second planetary gears $2_1$ and $2_2$ are respectively connected together, and an output gear 1b of the transmission 1 is connected to the carriers 2d of both the planetary gears $2_1$ and $2_2$. The ring gears 2b of both the planetary gears $2_1$ and $2_2$ are connected, via a one-way clutch 3 which serves as a reaction force receiver, to a casing 1c of the transmission 1. The sun gear 2a of the third planetary gear $2_3$ is connected to the input shaft 1a, and the carrier 2d of the third planetary gear $2_3$ is connected to the casing 1c to prevent rotation.

The transmission 1 is provided with the following as hydraulic engaging elements, i.e., a first clutch C1 for connecting the input shaft 1a to the sun gear 2a of the first planetary gear $2_1$, a second clutch C2 for connecting the input shaft 1a to the ring gears 2b of the first and the second planetary gears $2_1$ and $2_2$, a third clutch C3 for connecting the ring gear 2b of the third planetary gear $2_3$ to the sun gear 2a of the second planetary gear $2_2$, a first brake B1 for connecting the sun gear 2a of the second planetary gear $2_2$ to the carrier 2d of the third planetary gear $2_3$, and a second brake B2 for connecting the ring gears 2b of the first and the second planetary gears $2_1$ and $2_2$ to the casing 1c.

According to the above-described arrangement, when the first clutch C1 is engaged, the first-speed transmission train is established, when the first clutch C1 and the first brake B1 are both engaged, the second-speed transmission train is established, when the first clutch C1 and the third clutch C3 are both engaged, the third-speed transmission train is established, when the first clutch C1 and the second clutch C2 are both engaged, the fourth-speed transmission train is established, when the second clutch C2 and the third clutch C3 are both engaged, the fifth-speed transmission train is established, when the third clutch C3 and the second brake B2 are both engaged, the reverse transmission train is established, and when the first clutch C1 and the second brake B2 are both engaged, the first-speed transmission train is established in a condition in which the engine brake can be effected or applied.

The operation of the clutches C1, C2 and C3 and the brakes B1 and B2 is controlled by a hydraulic circuit shown in FIG. 2. The hydraulic circuit is provided with a hydraulic oil pressure source 6, a manual valve 7, first through fifth solenoid valves S1–S5 for independently controlling the supply and discharge of hydraulic oil to and from each of the hydraulic clutches C1, C2 and C3 and each of the brakes B1 and B2, and a control circuit portion 8 for the lockup clutch 4.

The manual valve 7 can be changed over or switched in interlocking with the operation of a selecting lever (not shown), among the R position for reverse running range, the N and P positions for neutral and parking ranges, the D position for automatic transmission (or speed changing) range, and the L position for first-speed holding range. In the D position and the L position, an oil passage L1 to be communicated with the hydraulic oil pressure source 6 is connected to an oil passage L2, and pressurized oil regulated by a regulator 9 to a predetermined line pressure is supplied to the oil passage L2. The hydraulic oil is thus supplied via this oil passage L2 to the first solenoid valve S1 for the first clutch C1, the second solenoid valve S2 for the second clutch C2, the fourth solenoid valve S4 for the first brake B1, and the fifth solenoid valve S5 for the second brake B2. The third solenoid valve S3 for the third clutch C3 is always supplied with the hydraulic oil via the oil passage L1, irrespective of the manual valve 7.

To the second through the fourth solenoid valves S2, S3 and S4 there are directly connected the second clutch C2, the third clutch C3 and the first brake B1 via oil passages L3, L4 and L5 which are respectively on the downstream side of each. To an oil passage L6 which is on the output side of the first solenoid valve S1, there is connected an oil passage L7 to be communicated with the first clutch C1 via the manual valve 7 in its D position. To an oil passage L8 which is on the downstream side of the fifth solenoid valve S5, there is connected an oil passage L9 via the manual valve 7 in its D position and is connected an oil passage L10 in its L position. The oil passage L9 is connected to an oil passage L11 to be communicated with the control circuit portion 8 of the lockup clutch 4 via a changeover valve 10 which is described hereinafter. The oil passage L10 is connected to an oil passage L12 to be communicated with the second brake B2 also via the changeover valve 10. Further, in the L position of the manual valve 7, the oil passage L7 is connected to the oil passage L1 via a communicating passage L7a around the manual valve 7. There is further provided an oil passage L13 which is connected to the oil passage L12 via a shuttle valve 11 so that the oil passage L13 may be connected to the oil passage L1 in the R position of the manual valve 7.

In this arrangement, in the L position of the manual valve 7 the first clutch C1 is always engaged and, when the oil passage L10 is connected to the oil passage L12 via the changeover valve 10, it becomes possible to control the second brake B2 by the fifth solenoid valve S5. The first-speed transmission train is thus established in a condition in which, by the engagement of the second brake B2, the engine brake can be applied. In the R position of the manual valve 7 the second brake B2 is always engaged, and the reverse transmission train is established by the engagement of the third clutch C3 due to the oil supply from the third solenoid valve S3.

In the D position of the manual valve 7, it becomes possible to supply the hydraulic oil to all of the solenoid valves S1–S5. When the first clutch C1 is supplied with the hydraulic oil via the first solenoid valve S1 and is engaged, the first-speed transmission train is established. When the first clutch C1 and the first brake B1 are both supplied with the hydraulic oil via the first solenoid valve S1 and the fourth solenoid valve S4 and are engaged, the second-speed transmission train is established. When the first clutch C1 and the third clutch C3 are both supplied with the hydraulic oil via the first solenoid valve S1 and the third solenoid valve S3 and are engaged, the third-speed transmission train is established. When the first clutch C1 and the second clutch C2 are both supplied with the hydraulic oil via the first solenoid valve S1 and the second solenoid valve S2 and are engaged, the fourth-speed transmission train is established. When the second clutch C2 and the third clutch C3 are both supplied with the hydraulic oil via the second solenoid valve S2 and the third solenoid valve S3 and are engaged, the fifth-speed transmission train is established. When the oil passage L9 is connected to the oil passage L11 via the changeover valve 10, it becomes possible to control the operation of the lockup clutch 4 by the output pressure of the fifth solenoid valve S5.

Each of the solenoid valves S1–S5 can be switched between an open condition in which the oil passage on the upstream side is communicated (or is brought into communication) with the oil passage on the downstream side, and a closed condition in which this communication is shut off to thereby connect the oil passage on the downstream side to the oil discharge port of each valve. In the D position, the opening and closing of the first through the fourth solenoid valves S1–S4 are controlled by an electronic control circuit (not shown) depending on the running conditions of the vehicle to thereby effect the automatic transmission or speed changing from the first-speed through the fifth-speed transmission trains. The first and the third solenoid valves S1 and S3 are arranged in normally-open type, and the second, the fourth and the fifth solenoid valves S2, S4 and S5 are arranged in normally-closed type.

The energized conditions of the solenoid valves S1–S5 and the engaged conditions of the hydraulic engaging elements at the time of establishing respective speed transmission trains in the D position, at the time of establishing the first-speed transmission train in the L position, and at the time of establishing the reverse transmission train in the R position are shown in Table 1. In the Table, the mark "O" shows that the hydraulic engaging element is in an engaged condition and the mark "–" shows that the hydraulic engaging element is in a disengaged condition.

TABLE 1

| Hydraulic engaging element | | | | | Solenoid valve | | | | |
|---|---|---|---|---|---|---|---|---|---|
| C1 | C2 | C3 | B1 | B2 | S1 | S2 | S3 | S4 | S5 |
| D | | | | | | | | | |
| 1st speed | | | | | | | | | |
| O | — | — | — | — | OFF | OFF | ON | OFF | DUTY |
| 2nd speed | | | | | | | | | |
| O | — | — | O | — | OFF | OFF | ON | ON | DUTY |
| 3rd speed | | | | | | | | | |
| O | — | O | — | — | OFF | OFF | OFF | OFF | DUTY |
| 4th speed | | | | | | | | | |
| O | O | — | — | — | OFF | ON | ON | OFF | DUTY |
| 5th speed | | | | | | | | | |
| — | O | O | — | — | ON | ON | OFF | OFF | DUTY |
| R | | | | | | | | | |
| — | — | O | — | O | OFF | OFF | OFF | OFF | OFF |
| L | | | | | | | | | |
| O | — | — | — | O | OFF | OFF | ON | OFF | ON |

The changeover valve 10 can be switched between the rightward (as seen in the Figure) first position in which the oil passage L9 and the oil passage L11 are communicated together and in which the communication between the oil passage L10 and the oil passage L12 is shut off to thereby connect the oil passage L12 to the oil discharge port 10a, and the leftward second position (i.e., the illustrated position) in which the communication between the oil passage L9 and the oil passage L11 is shut off to thereby connect the oil passage L11 to the oil discharge port 10i and also in which the oil passage L10 and the oil passage L12 are communicated with each other. The changeover valve 10 is urged or pushed towards the first position by the hydraulic oil pressure to be inputted to the three stages of front and rear oil chambers 10c, 10d and 10e in the left end portion, and is urged towards the second position by the hydraulic oil pressure to be inputted to the right end oil chamber 10f and by a spring 10g inside the oil chamber 10f.

To the oil chamber 10c there is connected, via a branched oil passage L3a, the oil passage L3 for the second clutch C2 which is engaged at the fourth speed and the fifth speed. To the oil chamber 10d there is connected, via a branched oil passage L5a, the oil passage L5 for the first brake B1 which is engaged at the second speed. Further, in the second position of the changeover valve 10, the oil chamber 10e is connected to the oil discharge port 10a via an oil passage L14 and, in the first position thereof, it is connected to a branched oil passage L2a of the oil passage L2 via the oil passage L14. To the oil chamber 10f there is connected an oil passage L15, which is connected to the oil passage L6 on the output side of the first solenoid valve S1 in the L position of the manual valve 7. In the D position and the R position, the oil passage L15 is opened to the atmosphere.

In this arrangement, in the D position of the manual valve 7, the changeover valve 10 is switched to the first position against the spring 10g respectively by the hydraulic engaging pressure of the first brake B1 inputted to the oil chamber 10d at the time of establishment of the second-speed transmission train, which is a relatively low-speed transmission train among those other than the first-speed transmission train, as well as by the hydraulic engaging pressure of the second clutch C2 inputted to the oil chamber 10c at the time of establishment of the fourth-speed transmission train and the fifth-speed transmission train, which are relatively high-speed transmission trains. Once the changeover valve 10 is switched to the first position, the line pressure in the oil passage L2, which serves as the first signal pressure to be maintained at a constant pressure without being subjected to the influence of speed changing, is inputted to the oil chamber 10e via the branched oil passage L2a and the oil passage L14. Thereafter, the changeover valve 10 is maintained in the first position. By the way, when the manual valve 7 is switched from the D position to the N or P position, or to the R position, the oil passage L2 is opened to the atmosphere, with the result that the hydraulic oil pressure is no longer inputted to the oil chambers 10c, 10d and 10e, The changeover valve 10 is, therefore, switched to the second position by the urging force of the spring 10g.

The control circuit portion 8 for the lockup clutch 4 is to control the operation of the lockup clutch 4 with the hydraulic oil to be supplied from the regulator 9 via an oil passage L16 as the working oil. It is made up of a shift valve 80 for controlling the switching on and off of the lockup clutch 4, a control valve 81 for controlling the oil pressure to increase or decrease the engaging force of the lockup clutch 4, and a pressure adjusting valve 82 which is interposed in an oil discharge passage LD to be communicated with an internal space of the fluid torque converter 5.

The shift valve 80 can be switched between the rightward OFF position (the one as illustrated) in which an oil passage L17 to be communicated with the back pressure chamber of the lockup clutch 4 is connected to the oil passage L16, and the leftward ON position in which an oil passage L18 to be communicated with the internal space of the fluid torque converter 5 is connected to the oil passage L16 through the control valve 81 and also in which the oil passage L17 is connected to an oil passage L19 to be communicated with the control valve 81. The shift valve 80 is urged by a spring 80a towards the OFF position and is urged by the hydraulic oil pressure to be inputted to a right end oil chamber 80b towards the ON position.

The control valve 81 is urged by a spring 81a towards the rightward open side in which the oil passage L19 is connected to the oil passage L18. In the right end side thereof there are provided two stages of front and rear oil chambers 81b and 81c, and the hydraulic oil pressure in the oil passage L19 is inputted to the oil chamber 81b so that the hydraulic oil pressure in the oil passage L19 can be reduced depending on the hydraulic oil pressure to be inputted to the oil chamber 81c.

To the oil chamber 80b of the shift valve 80 and to the oil chamber 81c of the control valve 81 there is connected the oil passage L11. When the changeover valve 10 is switched to the first position in the D position of the manual valve 7, the output oil pressure P of the fifth solenoid valve S5 is inputted to both the oil chambers 80b and 81c via the oil passage L8, the oil passage L9 and the oil passage L11. When the output oil pressure P of the fifth solenoid valve S5 has risen above a predetermined first set pressure P1, the shift valve 80 is switched to the ON position. When the output oil pressure P has risen above a second set pressure P2 that is set above P1, the control valve 81 is moved from the rightward fully-open position to the left, thereby reducing the hydraulic oil pressure in the oil passage L19 depending on the increase in the output oil pressure.

When P<P1, the shift valve 80 is in the OFF position. The hydraulic oil is therefore supplied from the oil passage L16 to the back pressure chamber of the lockup clutch 4 via the oil passage L17 and is also discharged from the inner space of the fluid torque converter 5 via the oil passage L18 and the shift valve 80, whereby the lockup clutch 4 is switched off. When P≦P1, the shift valve 80 is switched to the ON position. The hydraulic oil is therefore supplied from the oil passage L16 to the inner space of the fluid torque converter 5 via the oil passage L18, whereby the hydraulic oil pressure in the inner space becomes a relatively high pressure that is defined by the pressure adjusting valve 82. As a result, the lockup clutch 4 is urged by the hydraulic oil pressure towards the engaging direction. When P1≦P<P2, on the other hand, since the control valve 81 is in the fully-open position, the hydraulic oil pressure in the oil passage L19 becomes equal to that in the oil passage L18. Consequently, the hydraulic oil pressure in the inner space of the fluid torque converter 5 and the pressure of the hydraulic oil inputted to the back pressure chamber of the lockup clutch 4 via the oil passage L17 become equal to each other. The lockup clutch 4 is therefore maintained substantially in the OFF condition. When P≧P2, since the hydraulic oil pressure in the oil passage L19 becomes lower than the hydraulic oil pressure in the oil passage L18, the lockup clutch 4 is switched on, whereby the engaging force of the lockup clutch 4 will increase with the increase in the pressure P.

Next, the operation or function of the apparatus in the above-described embodiment will be explained.

When the manual valve 7 is switched from the N or P position to the D position to start the vehicle, the hydraulic oil is first supplied to the first clutch C1 via the first solenoid valve S1, thereby establishing the first-speed transmission train. At this stage, however, since the changeover valve 10 is in the second position, the output pressure of the fifth solenoid valve S5 is not inputted to the control circuit portion 8 of the lockup clutch 4. Therefore, even if the output pressure of the fifth solenoid valve S5 remains in a high pressure due to its failure or trouble, the lockup clutch 4 will not be switched on. The vehicle can therefore start smoothly without giving rise to an engine stalling due to a torque amplifying function of the fluid torque converter 5.

When the vehicle speed is upshifted to the second transmission train after starting of the vehicle, the changeover valve 10 is switched to the first position as described above and will be maintained in the first position even if the speed is changed. In this condition, the oil passage L8 on the output side of the fifth solenoid valve S5 is connected, via the oil passage L9, to the oil passage L11 which controls the lockup clutch 4. By varying the output pressure of the fifth solenoid valve S5 by duty control of the fifth solenoid valve S5, the operation of the lockup clutch 4 can be controlled as described above. There is therefore no possibility that the control of the clutch 4 becomes unstable at the time of speed changing.

If the manual valve 7 is returned, by wrong operation or the like, once to the N or P position and then to the D position while running at a high speed in the fourth-speed or the fifth-speed transmission train, the fourth-speed or the fifth-speed transmission train is established from the beginning. In this case, since the changeover valve 10 is switched to the second position in the N or P position, if an arrangement is made such that the changeover valve 10 can be switched to the first position only at the time of establishment of the second-speed transmission train, the changeover valve 10 is not switched to the first position until the speed is downshifted to the second-speed transmission train. During this time the lockup clutch 4 cannot be switched on, resulting in a poor specific fuel consumption. However, in the present embodiment, since the changeover valve 10 can be switched to the first position even during the establishment of the fourth-speed and the fifth-speed transmission trains, there will occur no such disadvantage as mentioned above.

By the way, if the changeover valve 10 is switched to, and maintained in, the first position during the running in the D position of the manual valve 7, the engine stalling will occur at the time of stopping of the vehicle because, if the output pressure of the fifth solenoid valve S5 remains in the high pressure due to its trouble or failure, the lockup clutch 4 remains switched on even when stopping the vehicle by applying brake. Thereafter, when the manual valve 7 is once switched to the N or the P position, the changeover valve 10 can be switched to the second position. Therefore, there is no possibility that the engine causes stalling at the time of starting of the vehicle. However, in order to prevent the stalling of the engine at the time of stopping the vehicle again, the transmission trains in which the changeover valve 10 is switched to the first position can not be established. In such a case, if only the first-speed transmission train can be established, there will be a hindrance to running of the vehicle. In the present embodiment, however, since the changeover valve 10 is not switched to the first position even if the third-speed transmission train has been established, not only the first-speed transmission train but also the third-speed transmission train can therefore be established, resulting in little or no hindrance to the running of the vehicle.

When the manual valve 7 is switched from the D position to the L position, the hydraulic oil is directly supplied from the oil passage L1 to the oil passage L7, so that the first clutch C1 is engaged irrespective of the first solenoid valve S1. Further, the oil passage L10 is connected to the oil passage L8 on the output side of the fifth solenoid valve S5. When the changeover valve 10 is switched to the second position and the oil passage L10 is thereby connected to the oil passage L12, it becomes possible to engage the second brake B2 by means of the fifth solenoid valve S5. The first-speed transmission train can thus be established in a condition in which the engine braking can be applied (hereinbelow referred to as "engine braking first-speed transmission train").

If the engine braking first-speed transmission train is established while running at a high speed, sudden engine braking is applied to thereby cause shocks. Therefore, when switching is made to the L position while running at the high speed, the speed control is made such that the fifth solenoid valve S5 is opened after the vehicle speed has been reduced below a predetermined value in the third-speed transmission train or the second-speed transmission train, and then engage the second brake B2. In this case, even if the oil passage L8 is directly connected to the oil passage L12 in the L position of the manual valve 7, the predetermined speed changing can be made provided that the fifth solenoid valve S5 is normal. However, if the fifth solenoid valve S5 remains open due to its failure or trouble, the second brake B2 normally will be engaged immediately upon switching to the L position and the engine braking first-speed transmission train is established. Therefore, shocks occur.

On the other hand, in the present embodiment, even if the fifth solenoid valve S5 remains opened, the second brake B2 will not be engaged until the changeover valve 10 is switched to the second position after the manual valve 7 was switched to the L position. The changeover valve 10 is urged to the second position by the output pressure of the first solenoid valve S1, which output pressure being a variably controllable second signal pressure which is inputted to the oil chamber 10f via the oil passage L15 to be connected, in the L position, to the oil passage L6 on the output side of the first solenoid valve S1. When this output pressure has become a high pressure, it is switched to the second position against the urging force of the line pressure, which line pressure being the first signal pressure being inputted to the oil chamber 10e. After it has been switched from the D position to the L position, the first solenoid valve S1 is closed at above a predetermined vehicle speed to thereby make its output pressure to a low pressure (the atmospheric pressure). When the vehicle speed has become smaller than the predetermined speed, the first solenoid valve S1 is opened and the changeover valve 10 is switched to the second position by making its output pressure a high pressure (line pressure). The engine braking first-speed transmission train can thus be established without giving rise to shocks.

When switching has been made to the L position to further decelerate the vehicle speed while running at the second-speed transmission train in the D position, it is preferred that the second brake B2 is engaged immediately to enable the engine braking first-speed transmission train to be engaged or established with a good response. Here, during the running in the second-speed transmission train, the changeover valve 10 is urged towards, and maintained in, the first position by the line pressure inputted to the oil chamber 10e and the engaging pressure (line pressure) of the first brake B1 inputted to the oil chamber 10d. Therefore, in the present embodiment, a pressure receiving area of the changeover valve 10 relative to the oil chamber 10f is made larger than the total pressure receiving area of the changeover valve 10 relative to both the oil chambers 10d and 10e. It is thus so arranged that, when switched to the L position, the changeover valve 10 can be quickly switched to the second position by the high output pressure from the first solenoid valve S1 without waiting for the reduction in the engaging pressure in the first brake B1.

Figure 3:
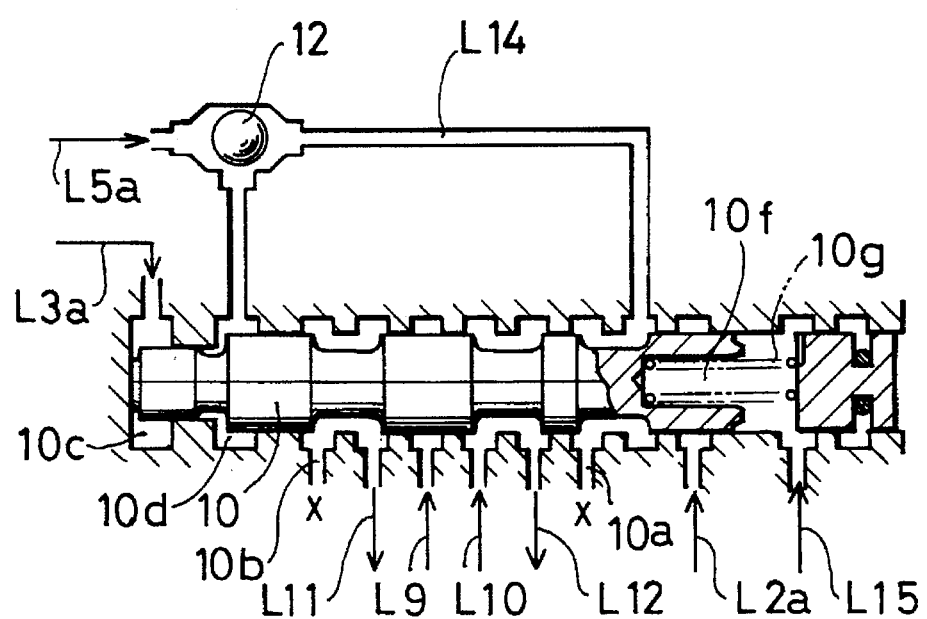
FIG. 3 is a sectional view showing another embodiment of the changeover valve shown in FIG. 2.

In the above-described embodiment, the hydraulic oil pressure inputting means for the first signal pressure to hold the changeover valve 10 in the first position is arranged by the oil passage L14 and the oil chamber 10e. In order to use the oil chamber for inputting the hydraulic oil pressure to be generated at the time of establishing the transmission train in which the changeover valve 10 is switched to the first position, e.g., the oil chamber 10d for inputting the hydraulic oil pressure from the oil passage L5 to be generated at the time of establishing the second-speed transmission train, for the dual purpose as an oil chamber of the hydraulic oil pressure input means, the following arrangement may also be employed. Namely, the oil passage L14 is connected to the branched oil passage L5a of the oil passage L5 via a shuttle valve 12 as shown in FIG. 3 so that, when the changeover valve 10 is switched to the first position, the first signal pressure can be inputted from the branched oil passage L2a of the oil passage L2 to the oil chamber 10d via the oil passage L14, the shuttle valve 12 and the branched oil passage L5a.

Figure 4:
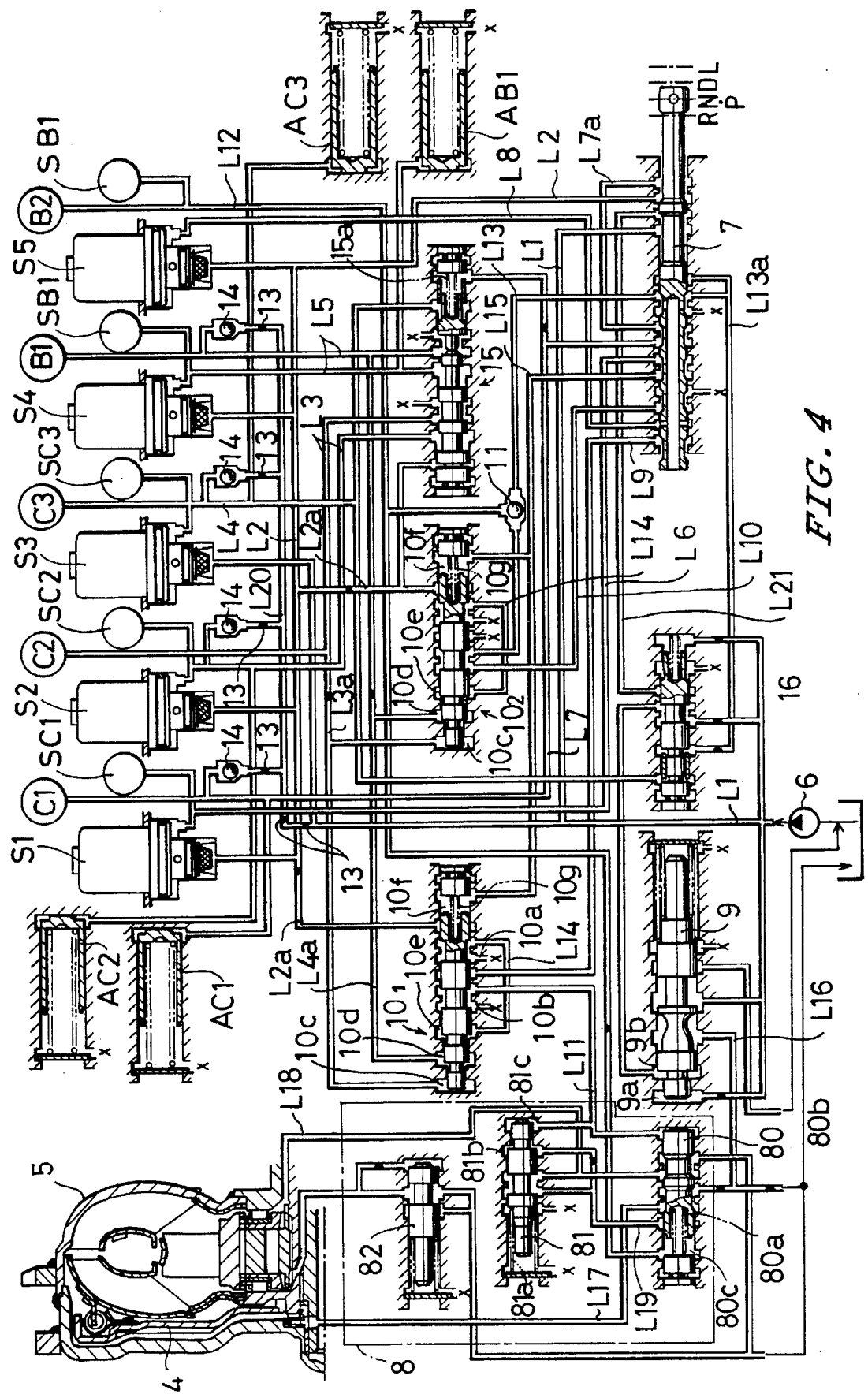
FIG. 4 is a diagram showing another example of the hydraulic circuit of the apparatus of the present invention.

Further, as in an embodiment shown in FIG. 4, the following arrangement may also be employed. Namely, the changeover valve is branched into a first changeover valve $10_1$ and a second changeover valve $10_2$. The communication of the oil passage L9 and the oil passage L11 is controlled by the first changeover valve $10_1$, and the communication of the oil passage L10 and the oil passage L12 is controlled by the second changeover valve $10_2$. Each of the first changeover valve $10_1$ and the second changeover valve $10_2$ is respectively provided with oil chambers 10c, 10d, 10e and 10f as in the changeover valve 10 of the above-described embodiment, and is switched in the same manner as the changeover valve 10.

In the embodiment shown in FIG. 4, the hydraulic oil is constantly supplied from an oil passage L20 in which a plurality of throttles 13 are interposed and which is communicated with the oil passage L1, via each of the check valves 14, to each of the oil passages L7, L3, L4 and L5 which are communicated with each of the hydraulic engaging elements comprising the first through the third clutches C1, C2 and C3 and the first brake B1. The inclusion or mixing of air into the oil passages L7, L3, L4 and L5 is thus prevented, and the speed change control is prevented from becoming unstable due to a delay in engagement caused by the inclusion of the air. At the time of disengagement of each of the hydraulic engaging elements C1, C2, C3 and B1, the hydraulic oil that flew into each of the oil passages L7, L3, L4 and L5 is discharged from the oil discharge port of each of the solenoid valves S1, S2, S3 and S4, and the amount of hydraulic oil supply is restrained by each throttle 13. Therefore, the hydraulic oil pressure in each of the oil passages L7, L3, L4 and L5 is maintained in such an extremely low pressure as not to cause dragging of each of the hydraulic engaging elements C1, C2, C3 and B1. The oil leakage from each of the oil passages L7, L3, L4 and L5 at the time of engagement of each of the hydraulic engaging elements C1, C2, C3 and B1 is blocked by each check valve 14. Therefore, there will be no such disadvantages that the hydraulic oil pressure control of the hydraulic engaging elements on the side of engagement becomes unstable due to the leakage in the hydraulic oil pressure or that, due to an increase in the amount of hydraulic oil supply from the oil passage L20 to the hydraulic engaging elements on the disengagement side, the hydraulic engaging elements give rise to dragging.

Further, in the embodiment shown in FIG. 4, there is provided a shutoff valve 15 which is interposed in the oil passage L3 for the second clutch C2 and the oil passage L5 for the first brake B1. This shutoff valve 15 can be switched between a rightward open position in which the upstream side and the downstream side of the oil passage L3 are communicated together and also the upstream side and the downstream side of the oil passage L5 are communicated together, and a leftward closed position in which the communication between the upstream side and the downstream side of each of the oil passages L3 and L5 is shut off and to thereby connect the downstream side of each of the oil passages L3 and L5 to an oil discharge port. This shutoff valve 15 is urged towards the open position by the hydraulic oil pressure in the oil passage L2, and is urged towards the closed position by a spring 15a, the hydraulic oil pressure on the upstream side of the oil passage L3, the hydraulic oil pressure on the upstream side of the oil passage L5, the hydraulic oil pressure in the oil passage L4 for the third clutch C3 and the hydraulic oil pressure in the oil passage L7 for the first clutch C1. It is thus arranged that, when the hydraulic oil pressure in three or more of the oil passages L3, L5, L4 and L7 become high at the same time, the shutoff valve 15 is switched to the closed position. In this arrangement, even if three or more of the first through the fourth solenoid valves S1–S4 open at the same time due to their failure or trouble, the second clutch C2 and the first brake B1 are prevented from engaging by the switching of the shutoff valve 15 to the closed position. Therefore, there is no possibility that two or more transmission trains are engaged at the same time.

In the embodiment in FIG. 4, the regulator 9 is provided with two stages of front and rear oil chambers 9a and 9b to urge it towards the pressure reduction direction (to the right). The oil chamber 9a can be directly connected to the oil passage L1, and the oil chamber 9b is selectively connected to the oil passage L1 via a pressure changeover valve 16 and to the oil passage L21 which is opened to the atmosphere in the R position of the manual valve 7. The pressure changeover valve 16 is urged to the rightward position in which the oil chamber 9b and the oil passage L21 are communicated together by the hydraulic oil pressure in a communicating passage L13a which is provided around the manual valve 7 for connecting the oil passage L13 to the oil passage L1 in the R position of the manual valve 7, and the hydraulic oil pressure in the oil passage L4 for the third clutch C3. In this arrangement, when the reverse transmission train is established, the oil chamber 9b is opened to the atmosphere via the oil passage L21 to thereby increase the output pressure of the regulator 9, i.e., the line pressure.

In the embodiment shown in FIG. 4, the hydraulic oil pressure in the oil passage L12 for the second brake B2 is operated on a left end oil chamber 80c of the lockup shift valve 80. When the engine braking low-speed transmission train or the reverse transmission train is established, the shift valve 80 is switched to the OFF position to thereby switch off the lockup clutch 4.

In FIG. 4, references AC1, AC2, AC3 and AB1 denote accumulators provided to prevent the speed change shocks by alleviating or absorbing the sudden change in the hydraulic oil pressure at the time of supply and discharge of the hydraulic oil to and from the first through the third clutches C1, C2 and C3 and the first brake B1 respectively. References SC1, SC2, SC3, SB1 and SB2 denote hydraulic oil pressure sensors for detecting the hydraulic oil pressures in the first through the third clutches C1, C2 and C3 and the first and the second brakes B1 and B2 respectively.

In case the transmission is of a two-parallel-shaft type having a first solenoid valve for controlling the hydraulic engaging elements exclusively used for reverse running and a second solenoid valve for controlling the hydraulic engaging elements exclusively used for engine braking, the following arrangement can be employed. Namely, in the automatic transmission range, the oil passage L9 of the above-described embodiment is connected to the output side of the first solenoid valve. In the low-speed holding range, the oil passage L10 of the above-described embodiment is connected to the output side of the second solenoid valve. The control of the lockup clutch in the automatic transmission range is thereby performed by the first solenoid valve, and the occurrence of shocks at the time of switching to the low-speed holding range can be prevented.

As can be seen from the above explanations, according to the present invention, even if the solenoid valves are in failure or trouble, the lockup clutch will not be switched on at the time of starting of the vehicle, and consequently the engine stalling does not occur. Further, when a predetermined transmission train has been established and the changeover valve has once been switched to the first position, the changeover valve is thereafter maintained in the first position. The lockup clutch can therefore be stably controlled in speed changing.

It is readily apparent that the above-described control device for a hydraulically operated transmission for a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated transmission for a vehicle, said transmission being connected to an engine of said vehicle via a fluid torque converter with a lockup clutch, said control apparatus comprising:

a control circuit portion for said lockup clutch;

a solenoid valve for controlling a hydraulic engaging element for speed changing which is engaged in a particular drive range;

said control apparatus being arranged such that, in another drive range in which said hydraulic engaging element is free from engagement, an output pressure of said solenoid valve is inputted to said control circuit portion to thereby control the operation of said lockup clutch; and a changeover valve which can be switched between a first position in which a first oil passage connected to an output side of said solenoid valve in said another drive range and a second oil passage to be communicated with said control circuit portion are brought into communication with each other, and a second position in which said communication is shut off;

said changeover valve being arranged to be switched to said first position by a hydraulic oil pressure which is generated at the time of establishing a predetermined transmission train other than a lowest transmission train that can be established in said another drive range;

said changeover valve comprising hydraulic oil pressure input means for inputting a predetermined first signal pressure as a hydraulic oil pressure to urge said changeover valve to said first position in interlocking with switching of said changeover valve to said first position, said first signal pressure being maintained to a constant pressure without influence by speed changing and being free from generation in a neutral range.

2. A control apparatus according to claim 1, wherein said predetermined transmission train comprises at least two transmission trains of a relatively low speed and a relatively high speed.

3. A control apparatus according to claim 2, wherein there is a transmission train of a medium speed between said transmission trains of the relatively low speed and the relatively high speed and wherein said transmission train of the medium speed is other than said predetermined transmission train.

4. A control apparatus according to any one of claims 1 through 3, wherein said first signal pressure is a hydraulic oil pressure of an oil passage which is connected to a hydraulic oil pressure source in said another drive range and which is opened to the atmosphere in the neutral range.

5. A control apparatus according to claim 1, further comprising a third oil passage which is connected to an output side of said solenoid valve in said particular drive range, wherein said third oil passage is connected to a control oil passage for controlling said hydraulic engaging element via said changeover valve in the second position of said changeover valve, and wherein said changeover valve can be switched to the second position by a variably controllable second signal pressure against an urging force of said first signal pressure.

6. A control apparatus according to claim 5, wherein said changeover valve is divided into a first changeover valve for controlling the communication between said first oil passage and said second oil passage, and a second changeover valve for controlling the communication between said third oil passage and said control oil passage for said hydraulic engaging element.

7. A control apparatus according to claim 5 or 6, further comprising a second solenoid valve which is other than said solenoid valve and which contributes to speed change control in said another drive range but which is free from contribution to speed change control in said particular drive range, and wherein said second signal pressure is a hydraulic oil pressure in a fourth oil passage which is connected to an output side of said second solenoid valve in said particular drive range.

8. A control apparatus according to claim 1, wherein said hydraulic oil pressure input means comprises an input oil passage for inputting said first signal pressure to said changeover valve and a valve portion which is formed integrally with said changeover valve for opening said input oil passage in said first position of said changeover valve.

9. A control apparatus according to claim 8, wherein said input oil passage is connected via a shuttle valve to an oil passage for inputting to said changeover valve a hydraulic oil pressure to be generated at the time of establishing said predetermined transmission train.

* * * * *

UNITED STATES PATENT AND TRADEMARK OFFICE
CERTIFICATE OF CORRECTION

PATENT NO.    : 5,641,043
DATED         : June 24, 1997
INVENTOR(S)   : Niiyama

It is certified that error appears in the above-identified patent and that said Letters Patent is hereby corrected as shown below:

Drawings,
Fig. 4, change the numeral "L4a" to read -- L5a --.
Fig. 4, add a lead line from the numeral "16".

Signed and Sealed this

Seventh Day of May, 2002

Attest:

Attesting Officer

JAMES E. ROGAN
Director of the United States Patent and Trademark Office